(12) United States Patent
Palisson et al.

(10) Patent No.: US 9,599,110 B2
(45) Date of Patent: Mar. 21, 2017

(54) GAS PUMPING AND TREATMENT DEVICE

(71) Applicant: ADIXEN VACUUM PRODUCTS, Annecy (FR)

(72) Inventors: Julien Palisson, Sillingy (FR); Arnaud Favre, Annecy (FR)

(73) Assignee: ADIXEN Vacuum Products, Annecy (FR)

( * ) Notice: Subject to any disclaimer, the term of this patent is extended or adjusted under 35 U.S.C. 154(b) by 318 days.

(21) Appl. No.: 14/350,835

(22) PCT Filed: Oct. 19, 2012

(86) PCT No.: PCT/EP2012/070795
§ 371 (c)(1),
(2) Date: Apr. 10, 2014

(87) PCT Pub. No.: WO2013/057272
PCT Pub. Date: Apr. 25, 2013

(65) Prior Publication Data
US 2014/0294609 A1 Oct. 2, 2014

(30) Foreign Application Priority Data

Oct. 19, 2011 (FR) ..................... 11 03200

(51) Int. Cl.
*F04C 19/00* (2006.01)
*F04C 23/00* (2006.01)
(Continued)

(52) U.S. Cl.
CPC .......... *F04C 19/004* (2013.01); *B01D 53/323* (2013.01); *B01D 53/68* (2013.01);
(Continued)

(58) Field of Classification Search
CPC ........ F04B 37/14; F04B 41/06; F04C 23/003; F04C 25/02; F04C 29/0092; F04C 2220/10; F04C 2220/20; A61L 2/14; A61L 2400/18
See application file for complete search history.

(56) References Cited

U.S. PATENT DOCUMENTS 5,131,825 A * 7/1992 Bachmann ............. B01D 53/04
417/243
6,152,071 A * 11/2000 Akiyama ................ C23C 16/24
118/723 AN
(Continued)

FOREIGN PATENT DOCUMENTS

CN 1364097 8/2002
CN 1403187 3/2003
(Continued)

*Primary Examiner* — William H Rodriguez
*Assistant Examiner* — Christopher Brunjes
(74) *Attorney, Agent, or Firm* — Patti & Malvone Law Group, LLC

(57) ABSTRACT

A device for pumping and treating gases is disclosed. The device features a stator having a plurality of pumping stages connected in series one after another between a suction side and a delivery side by the inter-stage ducts. The device also includes an inner tube and a blind outer tube, the tubes inserted one inside the other and made of ceramic material, the inner tube connected to the delivery side of the rotor housing of a pumping stage and the outer tube connected to the stator and communicating with at least one inter-stage duct formed in the stator, the tubes defining a path for the pumped gases. The device also includes a plasma source located outside the stator to generate a plasma in the path of the pumped gases.

16 Claims, 4 Drawing Sheets

(51) Int. Cl.
  *F04B 37/02* (2006.01)
  *F04B 37/14* (2006.01)
  *B01D 53/32* (2006.01)
  *B01D 53/68* (2006.01)

(52) U.S. Cl.
  CPC .............. *F04B 37/02* (2013.01); *F04B 37/14* (2013.01); *F04C 23/003* (2013.01); *B01D 2257/204* (2013.01); *B01D 2257/2045* (2013.01); *B01D 2257/2066* (2013.01); *B01D 2258/0216* (2013.01); *B01D 2259/818* (2013.01); *F04C 2220/10* (2013.01); *Y02C 20/30* (2013.01)

(56) References Cited

U.S. PATENT DOCUMENTS

| | | | | |
|---|---|---|---|---|
| 6,541,917 | B1 * | 4/2003 | Rostaing | H01J 37/32192 118/723 MW |
| 7,815,851 | B1 * | 10/2010 | Lewis | A61L 2/07 422/26 |
| 2004/0229419 | A1 | 11/2004 | Namose | |
| 2005/0142000 | A1 * | 6/2005 | Maquin | B01D 53/38 417/207 |

FOREIGN PATENT DOCUMENTS

| | | |
|---|---|---|
| CN | 1989345 | 6/2007 |
| EP | 0166846 | 1/1986 |
| EP | 0692635 | 1/1996 |
| EP | 1014761 | 6/2000 |
| EP | 1538656 | 6/2005 |
| WO | 02/097158 | 12/2002 |
| WO | 2007/091100 | 8/2007 |

\* cited by examiner

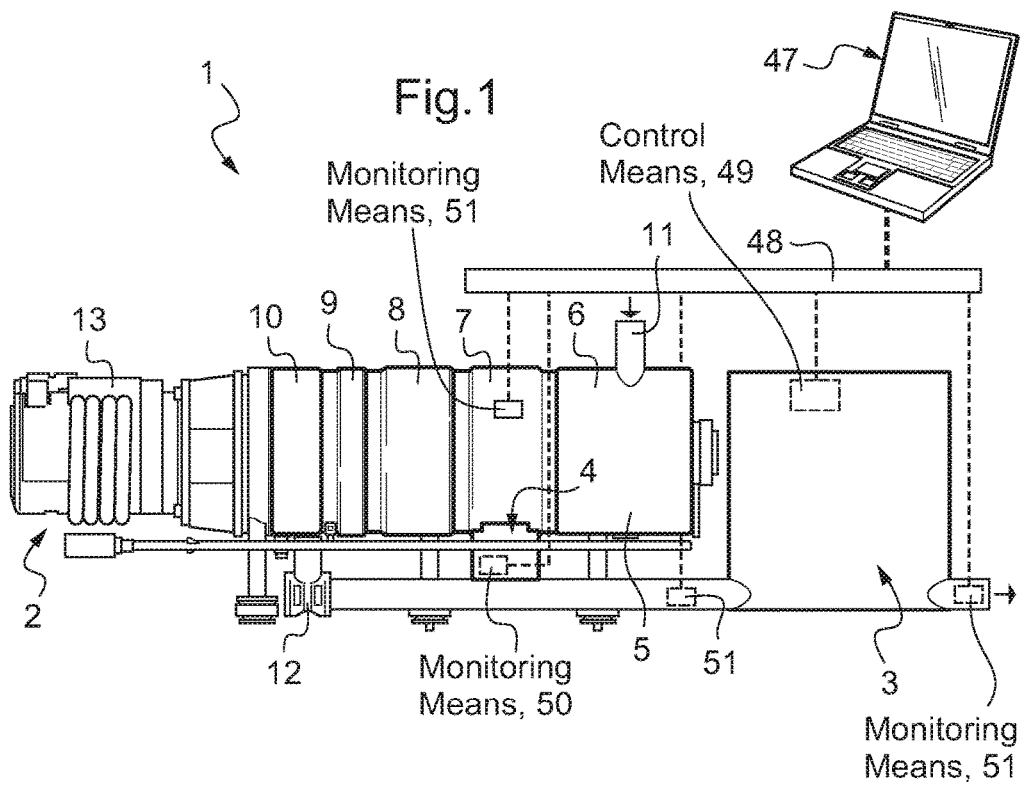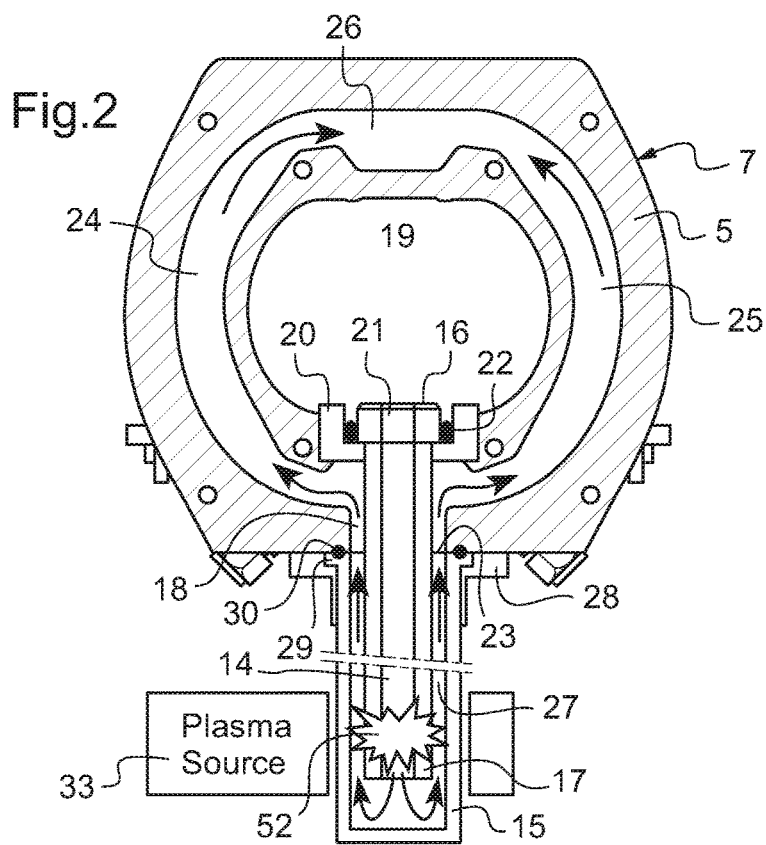

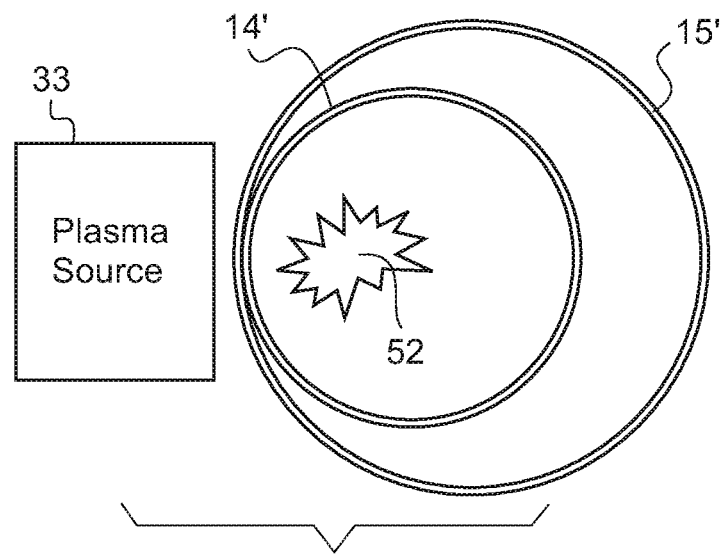
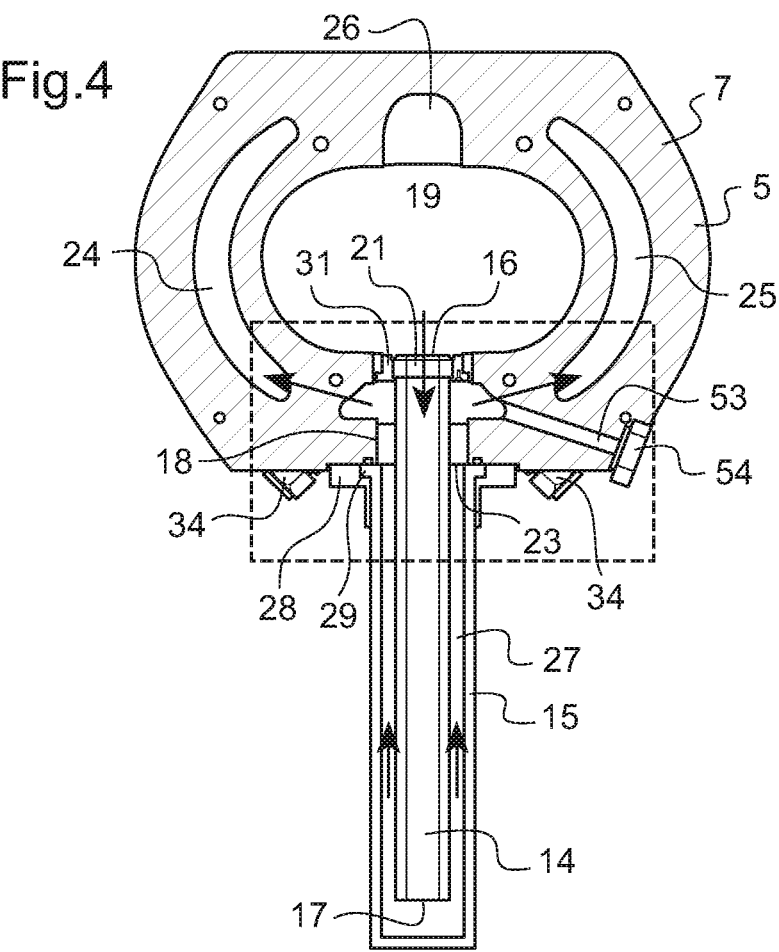

GAS PUMPING AND TREATMENT DEVICE

CROSS REFERENCE

This application claims the benefit of PCT patent application PCT/EP2012/070795 filed Oct. 19, 2012, the respective contents of which are hereby incorporated by reference in their entirety.

FIELD OF THE INVENTION

The present invention relates to the pumping and treating of the gases extracted from vacuum chambers such as the process chambers used in the manufacture of semiconductors. More particularly, the invention relates to a device for pumping and treating gases which is able to generate a plasma on gases circulating between two successive pumping stages.

BACKGROUND

The process gases used in the semiconductor industry, such as greenhouse gases of the PFC type, are generally toxic, corrosive or even harmful to the ozone layer or cause a strong greenhouse effect. It is therefore necessary to treat the extracted gases before any gas is discharged into the atmosphere, so that only gases that are relatively harmless are discharged.

Hitherto, process gases have essentially been treated in gas treatment facilities situated on the delivery side of the pumping systems.

One first disadvantage with these known gas treatment facilities is the large volume they have to have in order to treat the substantial quantity of outgoing flow. These gas treatment facilities are therefore situated remotely, i.e. are placed on a lower storey in the semiconductor manufacturing plant, and are connected to the process chamber by lengthy and expensive ducting. The sheer volume of these gas treatment facilities makes it impossible for them to be sited near to the process chambers.

A second disadvantage is that the flow exiting the pumping systems contains not only the gases that have been extracted from the process chambers but also purge gases that are introduced into the vacuum sequence between the outlet of the process chambers and the delivery side of the pumping systems. These purge gases, which are added in order to protect the pumping systems, disrupt the effectiveness of the treatment and lead to an additional increase in the volume of the gas treatment facilities.

Document EP 1 538 656 proposes performing an at least partial treatment of the gases between two successive stages of a vacuum pump of the pumping system, by situating, actually inside the vacuum pump, a plasma source which breaks down the gases that are to be pumped, including the harmful gases that are to be treated. These decomposed gases can be recombined in the vacuum pump with a reactant gas, such as water or oxygen, and this prevents the recomposition of the gases that have been decomposed by the plasma and recomposes them according to a controlled chemical reaction into by-products that are less harmful.

Incorporating the gas treatment system into the pumping unit means that the harmful gases can be treated as close as possible to the process chambers and this reduces the size of the gas treatment system and avoids having to site it remotely on a lower storey of the semiconductor manufacturing plant.

The plasma is, for example, generated in an inter-stage ducting inside the vacuum stator. Using this arrangement, the gas treatment system does not have a disruptive effect on the effectiveness of the pumping.

However, it is found that the plasma is too closely confined in the inter-stage ducting. This confinement limits the path of the molecules that are to be treated. In order to achieve good treatment effectiveness it then becomes necessary greatly to increase the power of the plasma source. By way of example, in order to obtain an effectiveness of the order of 90% regarding the decomposition of $CF_4$ gas in a conventional 200 mm oxide etching process, a plasma source with a power of the order of 3000 W is required. That leads to significant energy costs.

Moreover, the temperatures reached locally by the generation of the high-power plasma may lead to overheating of the body of the vacuum pump. This heating may cause the stator to expand, with the risk of causing it to deform, or in the worst case, even of causing the vacuum pump to seize. This overheating of the stator can also impair the sealing of the pump seals.

SUMMARY

In order to alleviate these disadvantages and others, the present invention proposes a device for pumping and treating gases which is able to generate a plasma on the gases circulating between two successive pumping stages, which operates durably and which does not impair the pumping capability of the vacuum pump.

To this end, the subject of the invention is a device for pumping and treating gases comprising a stator comprising a plurality of pumping stages connected in series one after another between a suction side and a delivery side by inter-stage ducts, characterized in that the device for pumping and treating gases comprises:

an inner tube and a blind outer tube, the tubes being inserted one inside the other and made of ceramic material, the inner tube being connected to the delivery side of the rotor housing of a pumping stage and the outer tube being connected to the stator and communicating with at least one inter-stage duct formed in the stator, the tubes defining a path for the pumped gases, and a plasma source located outside the stator to generate a plasma in the path of the pumped gases.

According to one or more features of the device for pumping and treating gases, considered individually or in combination:

the inner tube and the outer tube are coaxial, the axis of the inner tube is off-centred from the axis of the outer tube, the inner tube is connected inside the stator and the outer tube is connected to the outside of the stator, the device for pumping and treating gases further comprises a primary vacuum pump of the liquid ring pump type, the means for treating the gases is connected to the delivery side of the rotor housing of the second pumping stage, the pumping stages comprise a respective inlet arranged in the upper part of the device for pumping and treating gases and the tubes are arranged under the stator, the outer tube communicating with two inter-stage ducts formed one on either side of the housing, for connecting the upper inlet of the next pumping stage, the inlet end of the inner tube lies flush with the outlet from the housing of the second pumping stage, the inlet end of the inner tube is connected removably to the outlet and the opening of the outer tube is connected removably to the stator, the inlet end of the inner tube is connected to the stator by an intermediate metal support of the gas treatment means, a fixing collar is formed in the material of the inner tube, around the inlet end, and the intermediate support has an axial housing equipped with an annular groove accepting a seal, the fixing collar of the inlet end being fixed to the intermediate support by insertion into the axial housing, the intermediate support is screwed to the stator, a fixing shoulder is formed in the material of the outer tube, at the border of the opening, and the device for pumping and treating gases comprises an annular flange and a seal, the annular flange collaborating with the fixing shoulder to fix the outer tube to the stator in a sealed manner, the ceramic material of the inner tube and of the outer tube is boron nitride, the ceramic material of the inner tube and of the outer tube is aluminium nitride, the plasma source is a microwave plasma source, the vacuum pump comprises a means of injecting a reactant gas so as to inject a reactant gas into the stator downstream of the plasma source in the direction in which the gases to be pumped flow.

It is therefore the inner and outer tubes made of ceramic material belonging to the gas treatment means which act locally as pipes for the gases to be pumped. Ceramic materials have the advantage of being chemically inert and particularly robust to chemical attack and high gas temperatures. They are also electrically neutral and therefore transparent to the waves from the plasma source, allowing these waves to pass through the tubes to generate a plasma on the gases. In addition, ceramics are resistant to vacuum. The tubes made of ceramic therefore have all the qualities required firstly for the gas treatment means function and secondly for the vacuum pump pumping function.

The plasma is therefore partially contained in the ceramic tubes, thus avoiding the cast part of the stator becoming overheated. The gas treatment means therefore allows the interaction between the plasma and the gas to be pumped to be altered with ease by adjusting the length of the tubes to suit the desired power. The length of the tubes can be optimized in order to obtain a gas path that is long enough that it increases the residence time of the gas that is to be treated within the tubes and thus increases the size of the plasma. Specifically, the longer the residence time of the gases in the plasma the greater the probability that these gases will be decomposed by the plasma. It is therefore possible to guarantee the desired decomposition effectiveness of the plasma without having to increase the power of the plasma source.

What is more, the impact on pumping capability is limited for two main reasons.

First, the pressure of the gases in the plasma generation zone can be very low, for example less than 1 mbar. This low pressure can be obtained on the one hand by situating the gas treatment means at the outlet of the second pumping stage, near to the suction side, and on the other hand, using an additional pumping means.

Second, the geometry of the gas treatment system only very slightly limits the conductance of the path of the gases.

By comparison with a standard vacuum pump, i.e. one that has no inbuilt gas treatment means, the resultant conductance of the two tubes inserted one inside the other is reduced only by the half turn at the end of the course of the tubes. In relative terms, the length of the tubes has only a very small impact on conductance. The gas treatment means thus has the minimum of elbow or discontinuity in volume liable to slow the circulation of the gases and thus reduce the pumping capability of the vacuum pump.

As a result, there is no need to increase the power of the plasma source in order to guarantee the decomposition effectiveness of the plasma and the pumping capabilities of the vacuum pump are maintained. In order to obtain an effectiveness of the order of 90% for the decomposition of $CF_4$ gas in a conventional 200 mm oxide etching process, the power of the plasma source required is then below 2000 W. The running energy costs are therefore considerably lower and there is no longer any risk of the stator overheating.

Another advantage of the device for pumping and treating gases is that arranging the tubes at the outlet of the second pumping stage means that the first pumping stage can be kept free of decomposed gas. The first stage then acts as a filter, preventing any backscattering of decomposed gas upstream of the pumping and treatment device, into the process chamber.

In addition, the gases to be pumped leaving the second pumping stage contain very little of the purge gases that are introduced into each pumping stage. These purge gases, which are added in order to protect the vacuum pumps, may disrupt the effectiveness of the treatment. By siting the gas treatment means at the outlet of the second pumping stage, the harmful gases are processed even before they become diluted in the purge gases.

Further, when the device for pumping and treating the gases comprises a primary vacuum pump of the liquid ring pump type, in addition to reducing the pressure, the decomposed gases are neutralized by recombining them with an aqueous solution. The neutralization of the decomposed gases of the gas pumping and treatment device is therefore even more effective and its size is reduced.

The device for pumping and treating gases may also readily be fitted to existing vacuum pumps without the need for extensive modifications to the pumps.

BRIEF DESCRIPTION OF THE DRAWINGS

Further objects, features and advantages of the invention will become apparent from the following description, given by way of nonlimiting example, with reference to the attached drawings in which:

FIG. 1 is a schematic side view of elements of a device for pumping and treating gases, FIG. 2 is a schematic view in cross section of elements of the device for pumping and treating gases of FIG. 1, FIG. 3 is a schematic view in cross section of another example of tubes inserted one inside the other, FIG. 4 depicts a schematic view in cross section of elements of another embodiment of a device for pumping and treating gases.

DETAILED DESCRIPTION

Figure 5:
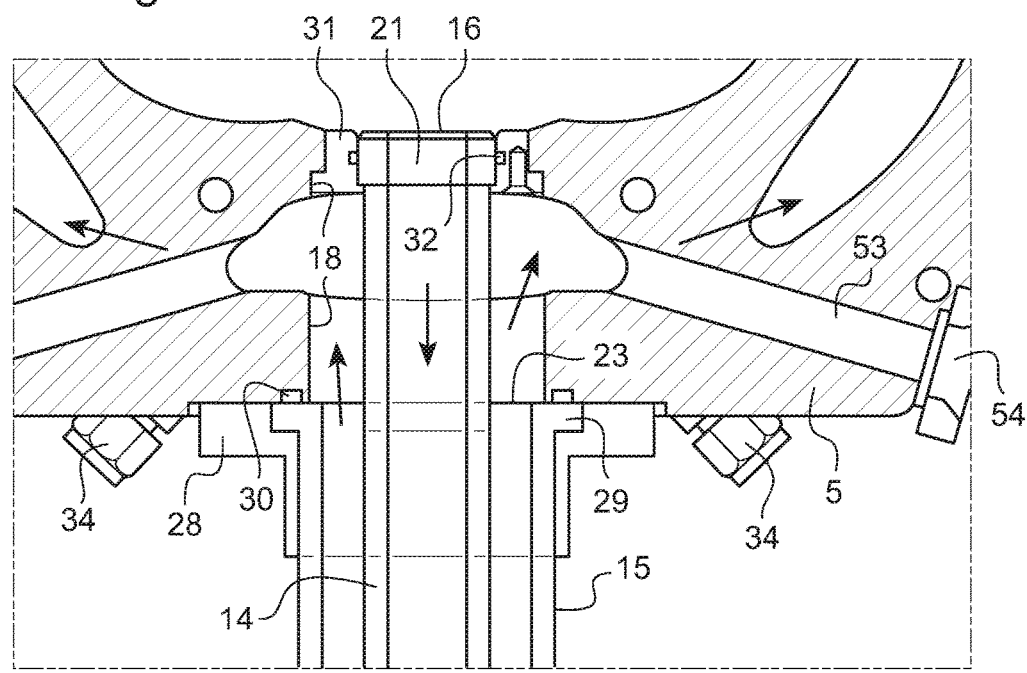
FIG. 5 is an enlargement of a detail identified in dotted line of the device of FIG. 4.

In these figures, elements that are identical bear the same reference numerals. For ease of understanding, only those elements necessary to understanding the invention have been depicted.

The device for pumping and treating gases 1 depicted in FIG. 1 comprises a vacuum pump 2, an additional pumping means 3 and a gas treatment means 4, comprising a plasma source able to generate waves capable of forming a plasma in a controlled atmosphere.

The device for pumping and treating gases 1 is, for example, connected to the outlet of a process chamber of a semiconductor manufacturing facility.

The vacuum pump 2 comprises a stator 5, generally of cast iron, comprising a plurality of pumping stages, in this example five pumping stages 6, 7, 8, 9 and 10 and inter-stage ducts.

The pumping stages 6, 7, 8, 9 and 10 respectively comprise a central housing having an inlet arranged in the upper part of the vacuum pump 2 and an outlet arranged in the lower part of the vacuum pump 2. The housings for the pumping stages 6, 7, 8, 9 and 10 are fluidically connected in series one after another by the inter-stage ducts. The inter-stage ducts connect the outlet of the preceding pumping stage to the inlet of the following pumping stage, between the suction side 11 of the vacuum pump 2 and the delivery side 12 thereof. The suction side 11 is, for example, connected to the outlet of the process chamber. The delivery side 12 is connected to the additional pumping means 3.

On the inside, the vacuum pump 2 comprises two rotors of identical profiles, rotating in the housings in opposite directions. During rotation the gas drawn in is trapped in the empty space between the rotors and the stator 5, then delivered to the next pumping stage. The rotors are carried by shafts which extend through the pumping stages and are driven by a motor 13 of the vacuum pump 2. The pumping stages 6, 7, 8, 9 and 10 are joined together to form a one-piece vacuum pump body through which the rotor shafts pass. The vacuum pump 2 is, for example, a dry vacuum pump known by the name of a "Roots" pump with two or three lobes or "Claws" depending on the shape of the lobes.

As can be seen from the illustrative example of FIGS. 1 and 2, the gas treatment means 4 can be arranged under the stator 5.

As can be seen better in FIG. 2 which is a view in cross section and face-on of the stator 5 in the region of the second pumping stage 7, the gas treatment means 4 comprises an inner tube 14 made of ceramic material and a blind outer tube 15 made of ceramic material.

Ceramic materials have the advantage of being chemically inert and particularly robust to chemical attack and to high gas temperatures. They are also electrically neutral and therefore transparent to the waves of the plasma source, allowing these waves to pass through the tubes 14, 15 to generate a plasma on the gases. In addition, ceramics are resistant to vacuum. The tubes made of ceramic therefore have all the qualities required firstly for the gas treatment means 4 function and secondly for the vacuum pump 2 pumping function. The tubes 14, 15 are, for example, made completely of boron nitride or of aluminium nitride, which is even stronger.

The inner tube 14 has an inlet end 16 and an outlet end 17 so that the gas for pumping can pass through it. The inner tube 14 passes through the thickness of the stator 5 at the second pumping stage 7 in an outlet duct 18 formed in the stator 5. The inlet end 16 is fixed to the outlet of the central housing 19 (at the inlet to the outlet duct 18).

The inlet end 16 is, for example, connected to the stator by an intermediate support 20, made of metal, such as stainless steel. The intermediate support 20 has an axial housing equipped with an annular groove accepting a seal 22 which is compressed between a fixing collar 21 of the inner tube 14, this collar being formed around the inlet end 16.

The outer tube 15 and the inner tube 14 are, for example, coaxial. The outer tube 15 accommodates the outlet end 17 of the inner tube 14.

According to another embodiment visible in FIG. 3, the axis of the inner tube 14' is off-centred from the axis of the outer tube 15'. The walls of the inner tube 14' are thus locally closer to the walls of the outer tube 15'. The plasma source 33 is designed to generate waves near this region in which the two tubes are closer together. Thus, the penetration of the waves into the inner tube 14 is encouraged because the thickness of gas that the waves have to pass through is smaller, making it easier for the plasma 52 to be formed inside the inner tube 14' but without in so doing restricting the bore section for the gases and therefore without limiting the conductance.

The outer tube 15 has a single opening 23 connected in a sealed manner to the stator 5, on the outside thereof. The opening 23 communicates with the inlets of the two inter-stage ducts 24, 25 formed one on each side of the central housing 19 and which are connected to the upper inlet 26 of the next pumping stage.

The tubes 14, 15 define a path for the pumped gases 27 partially on the outside of the stator 5.

More specifically, the path 27 for the gases to be pumped is formed at the outlet end 17 of the inner tube 14, between the inner tube 14 and the outer tube 15, and between the inner tube 14 and the outlet duct 18, downstream of the connection of the inlet end 16 of the inner tube 14 in the direction of flow of the pumped gases (see arrows in FIG. 2). The path of the gases 27 also communicates with the inlets of the two inter-stage ducts 24, 25.

Sealed connection of the outer tube 15 is, for example, achieved by assembling an annular flange 28 of the device 1 to the stator 5, the annular flange 28 holding a fixing shoulder 29 formed in the material of the outer tube 15, around the border of the opening 23, so as to fix the outer tube 15 to the stator 5. Further, the device for pumping and treating gases 1 comprises a seal 30 which is arranged between the fixing shoulder 29, for example in a groove formed in the stator 4, the annular flange 28 collaborating with the fixing shoulder 29 to fix the outer tube 15 to the stator 5 in a sealed manner.

According to one embodiment depicted in FIGS. 4 and 5, the inlet end 16 of the inner tube 14 is connected to the inlet of the outlet duct 18 so as to lie flush with the outlet of the central housing 19 accommodating the rotors, to ensure that it does not touch these.

Further, in this embodiment, the inlet end 16 of the inner tube 14 is fixed removably to the intermediate support 31. In addition, the intermediate support 31 is fixed removably to the stator 5. This makes the inner and outer tubes 14 and 15 easier to fit and to replace during the assembly stage and if they need replacing.

For example, the fixing collar 21 of the inlet end 16 is fixed to the intermediate support 31 by insertion into the axial housing 31a thereof, compressing a seal 32 that is housed in the annular groove 31b. The intermediate support 31 has a screw thread 31c to be screwed into the tapped outlet duct 18 of the stator 5. Sealing between the intermediate support 31 and the stator 5 can be achieved in the conventional way using Teflon (FIGS. 5 and 6).

Figure 6:
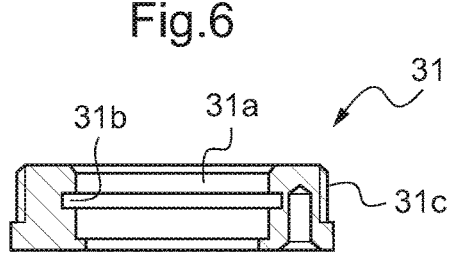
FIG. 6 is a view in cross section of the intermediate support of the means of treating gases of FIG. 4.
Figure 7:
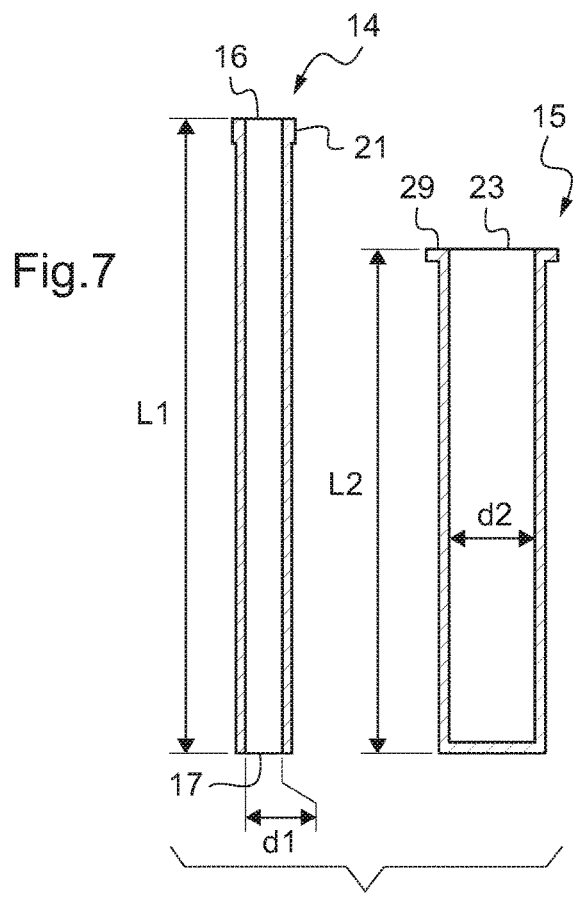
FIG. 7 depicts a view in cross section of the inner tube and of the outer tube of the means of treating gases of the device of FIG. 4.

The inner and outer tubes have been depicted more specifically in FIG. 6.

The diameters of the tubes 14, 15 are determined relative to the inside diameter dl of the inner tube 14 which is designed to be as large as possible in relation to the dimension of the outlet from the rotor housing 19. The cross section of the path 27 between the inner tube 14 and the outer tube 15 is at least equal to the inside diameter dl of the inner tube 14.

The inside diameter dl of the inner tube 14 is, for example, between 1 and 2 centimeters. It is preferably of the order of 1.5 cm. The thickness is for example of the order of 0.5 centimeters. The additional thickness of the tube 14 that forms the collar 21 is, for example, of the order of 0.14 centimeters over a length of 1 centimeter. The length L1 of the inner tube 14 is, for example, between 10 and 30 centimeters.

The inside diameter d2 of the outer tube 15 is, for example, between 3 and 5 centimeters. It is preferably of the order of 4.1 cm. The thickness is, for example, of the order of 0.5 centimeters. The additional thickness of the tube forming the collar is, for example, of the order of 0.5 centimeters over a length of 0.55 centimeters. The length of the outer tube is, for example, between 10 and 30 centimeters.

The length L2 of the outer tube 15 is, for example, of the order of 24 cm for a length L1 of the inner tube 14 of the order of 27 cm and the length between the outlet end 17 of the inner tube 14 and the end of the outer tube 15 for the path of the pumped gases is of the order of 1.2 cm.

This then maintains an optimized gas path 27, wide enough not to reduce the pumping effectiveness and not so voluminous as to create a discontinuity of volume or require an increase in power of the plasma source.

On assembly, the inner tube 14 is inserted into the intermediate support 21 and this assembly is screwed to the stator 5. Next, the outer tube 15 is passed around the inner tube 14 and this is fixed to the stator 5.

Returning to the diagram of FIG. 2, it may be seen that the plasma source 33 is located on the outside of the stator 5, near the outer tube 15, to generate a plasma 52 in the path of the pumped gases 27, partially between the outer tube 15 and the inner tube 14.

The plasma source is, for example, a plasma source of the microwave type 33. The microwave plasma source comprises, for example, a generator of magnetron type and a waveguide conveying the waves from the generator to the inner tube 14 and outer tube 15 in order to supply the power necessary for generating the plasma. The waveguide is connected by a metal component to the stator 5 so as to ensure grounding continuity. Grounding continuity means that the plasma extends outside of the waveguide. The waveguide is arranged around the outer tube 15.

The plasma source 33 may also comprise a means of monitoring plasma startup, making it possible for example, using an electrical signal, to indicate that the plasma 52 has been correctly started up following the switching-on of the generator.

Also, the plasma source 33 may comprise a plasma analysis means able to identify and quantify the decomposed gases in order to oversee correct operation of the gas pumping and treatment method performed by the device 1. For example, a blind conduit 53 is formed in the stator (FIG. 5). The blind end of the conduit 53 has a porthole 54 through which light can pass so that the light of the plasma can be analysed from outside the stator.

In order to reduce the energy consumption still further, the generator of the plasma source 33 may be pulsed. Power is then applied periodically, adjusting the period making it possible to reduce the mean power consumed.

The plasma allows at least some of the components in the pumped gases to be decomposed in order to break complex molecules down into smaller elements. The molecules targeted for decomposition may, for example, be perfluorocarbon compounds (PFCs), halogens or acid gases (HCl, $BCl_3$, etc).

The treatment of the gases using plasma can be improved by combining the decomposition of the gases using plasma with injection of reactant gas, such as oxygen or water vapour, which prevents the gases decomposed by the plasma from recomposing and which recomposes them in a controlled chemical reaction into by-products which are less harmful.

To do that, the vacuum pump 2 may comprise a means of injecting reactant gas to inject a reactant gas into the vacuum pump 2, downstream of the plasma source 33 in the direction in which the gases flow. The means of injecting reactant gas is, for example, formed by two reactant-gas ducts 34 which are connected to an external source of reactant gas and communicate with the path of the gases 27.

Advantageously, the additional pumping means 3 comprises a primary vacuum pump of the liquid ring pump type 35. Thus, the additional pumping means 3 is used to reduce the pressure in the second pumping stage 7 and also to neutralize the decomposed gases by recombining them with an aqueous solution.

Figure 8:
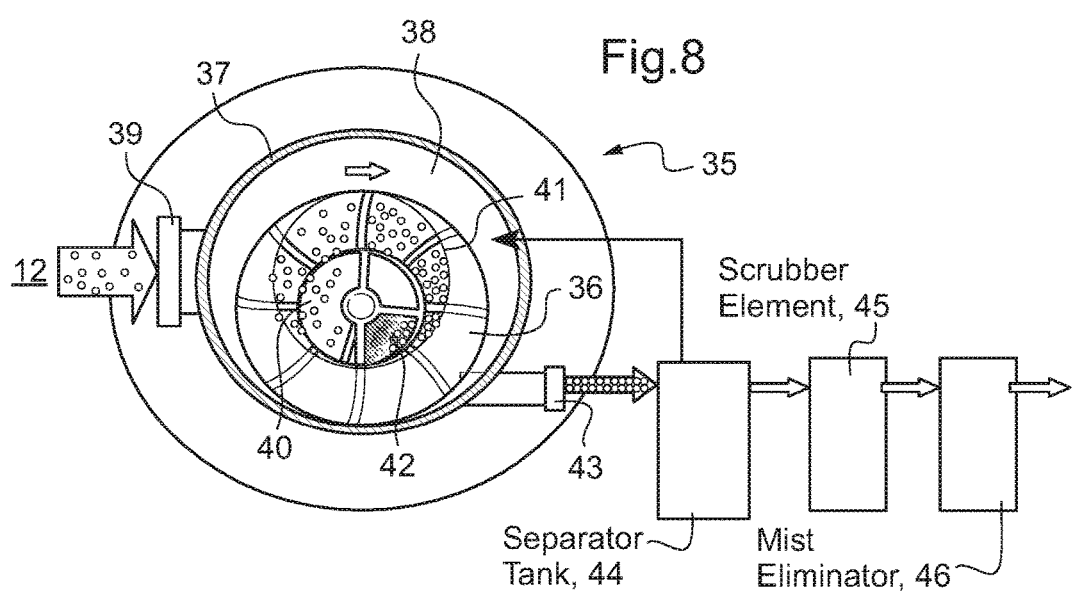
FIG. 8 depicts an additional pumping means and elements connected to the outlet of the additional pumping means.

An outline diagram indicating the operation of a liquid ring pump is given in FIG. 8. The liquid ring pump 35 generally comprises a turbine 36 the axis of which is off-centred with respect to the centre of a chamber 37 containing a liquid aqueous solution 38, for example water.

The gases received at the inlet port 39 are admitted to the chamber 37 at an intake zone 40. Because of the eccentricity of the turbine 36, the liquid 38 is displaced outwards creating a vacuum in the zone 40 that the gases enter. The gas is then driven by the turbine towards the compression zone 41. What actually happens is that the eccentricity of the turbine 36 causes in this zone a compression applied by the liquid 38 to the gas.

Further, causing the decomposed gases to react with the liquid 38 makes it possible to cause the acid compounds to react with a base to form a salt such as, for example, calcium or sodium fluoride or calcium or sodium chloride, this reaction making it possible to neutralize the acid gas into the form of a salt.

The gases finally reach the discharge zone 42 in which the compressed gas is discharged to the outlet port 43. Some of the liquid is also discharged with the gas which means that a diphasic fluid (gas+liquid) is expelled at an outlet port 43.

The primary vacuum pump of the liquid ring pump 35 may comprise several pumping stages in order to increase the exchange between the liquid 38 and the gases and therefore increase the overall effectiveness of the method.

At the outlet from the liquid ring pump 35, the mixture of water and gas is sent to a separator tank 44. Once the gaseous and liquid phases have been separated, some of the liquid is recycled within the liquid ring pump 35, in order to reduce water consumption.

At the outlet from the separator tank 44, the gaseous phase is transferred to a last scrubber element 45 that scrubs out the residual traces of toxic gas that have not yet been trapped. On leaving this scrubber element 45, the scrubbed gas is introduced into a mist eliminator 46 intended to trap any water molecules in suspension.

The device for pumping and treating gases 1 may comprise a processing unit 47 (FIG. 1), such as a computer, connected for example by a communication bus 48, to:
- a control means 49 of the additional pumping means 3, to control the additional pumping means 3,
- a monitoring means 50 of the plasma source comprising, for example, the means of analysing the plasma and the means of monitoring the start-up of the plasma, in order to monitor the plasma source, and
- monitoring means 51 for the gases to be pumped in the central housing of the second pumping stage 7 and/or in the delivery side 12 of the vacuum pump 2 and/or leaving the additional pumping means, in order to identify and/or quantify the pumped gases.

The processing unit 47 may also be connected to the semiconductor manufacturing facility the gases from which the device 1 pumps and treats. Thus, the facility may inform the device 1 of the nature and/or quantities of gases sent to the process chamber and likely to be received at the suction side of the device for pumping and treating gases. The processing unit 47 may then, for example, adapt the power of the plasma source on the basis of this information.

Also, by interfacing the processing unit 47 with the last scrubbing element 45, it is possible to adjust the amount of water necessary for that element in order to reduce the consumption thereof.

In operation, the gases for pumping from the process chamber are drawn into the vacuum pump 2. When they exit the second pumping stage 7, the gases pass through the inner tube 14 then leave the latter and pass between the two tubes 14, 15 to reemerge towards the inter-stage ducts 24, 25. The waves sent by means of the waveguide pass through the ceramic tubes 14, 15 and generate a plasma 52 under vacuum. The gases, once they have been decomposed, are removed in the inter-stage ductings 23, 24 after having been neutralized by the reactant gas, then outside the vacuum pump 2, by the liquid ring pump 35. The neutralized gases are then scrubbed.

The plasma is therefore at least partially sited remotely away from the stator 5 of the vacuum pump 2 in the ceramic tubes 14, 15. The length of the tubes 14, 15 can be optimized to obtain a gas path that is long enough to increase the residence time of the gas to be treated in the tubes 14, 15 and thus optimize the size of the plasma. It is then possible to guarantee the desired decomposition effectiveness of the plasma without having to increase the power of the plasma source.

Further, the impact on the pumping capability of the vacuum pump is limited, on the one hand, because the pressure of the gases in the plasma generation zone is lower than 1 mbar. This low pressure is obtained firstly by siting the gas treatment means at the outlet of the second pumping stage, near to the suction side of the vacuum pump, and secondly by the additional pumping means.

Second, the geometry of the gas treatment system only slightly very limits the conductance of the path of the gases. By comparison with a standard vacuum pump, i.e. one that has no inbuilt gas treatment means, the resultant conductance of the two tubes inserted one inside the other is reduced only by the half turn at the end of the course of the tubes 14, 15. In relative terms, the length of the tubes has only a very small impact on conductance. The gas treatment means thus has the minimum of elbow or discontinuity in volume liable to slow the circulation of the gases and thus reduce the pumping capability of the vacuum pump 2.

In order to obtain an effectiveness of the order of 90% for the decomposition of $CF_4$ gas in a conventional 200 mm oxide etching process, the power of the plasma source required is then below 2000 W. The running energy costs are therefore considerably lower and there is no longer any risk of the stator 5 overheating.

The device for pumping and treating gases 1 is therefore thus incorporated, without any overheating of the stator of the vacuum pump 2, without impairing the pumping capabilities of the vacuum pump 2 and while at the same time limiting energy requirements.

The invention claimed is:

1. Device for pumping and treating gases comprising a stator comprising a plurality of pumping stages connected in series one after another between a suction side and a delivery side by an inter-stage duct, the device for pumping and treating gases comprising:
   an inner tube and a blind outer tube, the tubes being inserted one inside the other and made of ceramic material, the inner tube being connected to the delivery side of the rotor housing of a pumping stage and the outer tube being connected to the stator and communicating with at least one inter-stage duct formed in the stator, the tubes defining a path for the pumped gases, and
   a plasma source located outside the stator to generate a plasma in the path of the pumped gases;
   wherein the pumping stages further comprise
   a respective inlet arranged in an upper part of the device for pumping and treating gases; and
   the tubes are arranged under the stator, the outer tube communicating with the inter-stage ducts, wherein the interstage ducts comprise a set of two inter-stage ducts formed one on either side of the housing, for connecting the upper inlet of the next pumping stage.

2. Device for pumping and treating gases according to claim 1, wherein the inner tube and the outer tube are coaxial.

3. Device for pumping and treating gases according to claim 1, wherein the axis of the inner tube is off-centred from the axis of the outer tube.

4. Device for pumping and treating gases according to claim 1, wherein the inner tube is connected inside the stator and the outer tube is connected to the outside of the stator.

5. Device for pumping and treating gases according to claim 1, wherein the device for pumping and treating gases further comprises a primary vacuum pump of a liquid ring pump type.

6. Device for pumping and treating gases according to claim 5, wherein the vacuum pump further comprises a means of injecting a reactant gas so as to inject a reactant gas into the stator downstream of the plasma source in the direction in which the gases to be pumped flow.

7. Device for pumping and treating gases according to claim 1, wherein the means for treating the gases is connected to a delivery side of the rotor housing of the second pumping stage.

8. Device for pumping and treating gases according to claim 1, wherein an inlet end of the inner tube lies flush with an outlet from the rotor housing of the second pumping stage.

9. Device for pumping and treating gases according to claim 8, wherein the inlet end of the inner tube is connected removably to the outlet and in which the opening of the outer tube is connected removably to the stator.

10. Device for pumping and treating gases according to claim 9, wherein the inlet end of the inner tube is connected to the stator by an intermediate metal support of the gas treatment means.

11. Device for pumping and treating gases according to claim 10, wherein a fixing collar is formed in the material of the inner tube, around the inlet end, and the intermediate support has an axial housing equipped with an annular groove accepting a seal, the fixing collar of the inlet end being fixed to the intermediate support by insertion into the axial housing.

12. Device for pumping and treating gases according to claim 10, wherein the intermediate support is screwed to the stator.

13. Device for pumping and treating gases according to claim 9, wherein a fixing shoulder is formed in the material of the outer tube, at the border of the opening, and the device for pumping and treating gases further comprises an annular flange and a seal, the annular flange collaborating with the fixing shoulder to fix the outer tube to the stator in a sealed manner.

14. Device for pumping and treating gases according to claim 1, wherein the ceramic material of the inner tube and of the outer tube is boron nitride.

15. Device for pumping and treating gases according to claim 1, wherein the ceramic material of the inner tube and of the outer tube is aluminium nitride.

16. Device for pumping and treating gases according to claim 1, wherein the plasma source is a microwave plasma source.

* * * * *